United States Patent [19]

Hsia

[11] Patent Number: 5,394,043
[45] Date of Patent: Feb. 28, 1995

[54] HIGH SPEED BRUSHLESS MOTOR

[75] Inventor: Song-Ling Hsia, Carlsbad, Calif.

[73] Assignee: American Precision Industries Inc., Buffalo, N.Y.

[21] Appl. No.: 84,569

[22] Filed: Jun. 29, 1993

[51] Int. Cl.$^6$ ............................................. H02K 7/08
[52] U.S. Cl. ........................................ 310/90; 310/51; 310/88; 310/89; 310/156; 310/261; 310/262; 310/DIG. 6; 384/624
[58] Field of Search ............ 310/90, 261, 262, DIG. 6, 310/258, 43, 51, 68 B, 156, 88, 89; 384/624, 275

[56] References Cited

U.S. PATENT DOCUMENTS

| | | | |
|---|---|---|---|
| 2,761,985 | 9/1956 | Schaefer | 310/43 |
| 2,876,370 | 3/1959 | Pfeuger | 310/43 |
| 3,688,137 | 8/1972 | Filhol | 310/43 |
| 3,742,595 | 7/1973 | Lykes | 310/43 |
| 4,088,914 | 5/1978 | Aoki | 310/90 |
| 4,733,118 | 3/1988 | Mihalko | 310/254 |
| 4,862,026 | 8/1989 | Riback | 310/90 |
| 4,900,968 | 2/1990 | Feigel | 310/43 |
| 4,937,485 | 6/1990 | Mihalko | 310/254 |
| 4,947,539 | 8/1990 | Aussieker | 310/90 |
| 5,233,248 | 8/1993 | Kawamura | 310/261 |

Primary Examiner—R. Skudy
Attorney, Agent, or Firm—Hodgson, Russ, Andrews, Woods & Goodyear

[57] ABSTRACT

A brushless d.c. motor comprising a housing, an annular stator coil structure with the housing, a rotor concentric with the stator and comprising a body having an output shaft portion extending from one end thereof toward the forward end of the housing for connection to a mechanical load for driving the same and a permanent magnet arrangement on the periphery of the rotor body operatively associated with the stator coil structure, a first bearing near the forward end of the housing for rotatably supporting the shaft portion of the rotor and wherein there is provided a second bearing axially inwardly of the rear end of the rotor for rotatably supporting that end of the rotor and a circuit board located between the rear end of the rotor and the rear end of the housing. By virtue of the location of the second bearing a rigid and vibration free structure is provided for operation of the motor at high speed. By virtue of the location of the second bearing and the circuit board potting material can encapsulate the stator coil structure and circuit board thereby completely sealing all electrical sections of the motor so that they can withstand autoclave sterilization conditions. A fluid passage arrangement equalizes pressure applied to the first and second bearings so that they can withstand autoclave sterilization conditions.

12 Claims, 1 Drawing Sheet

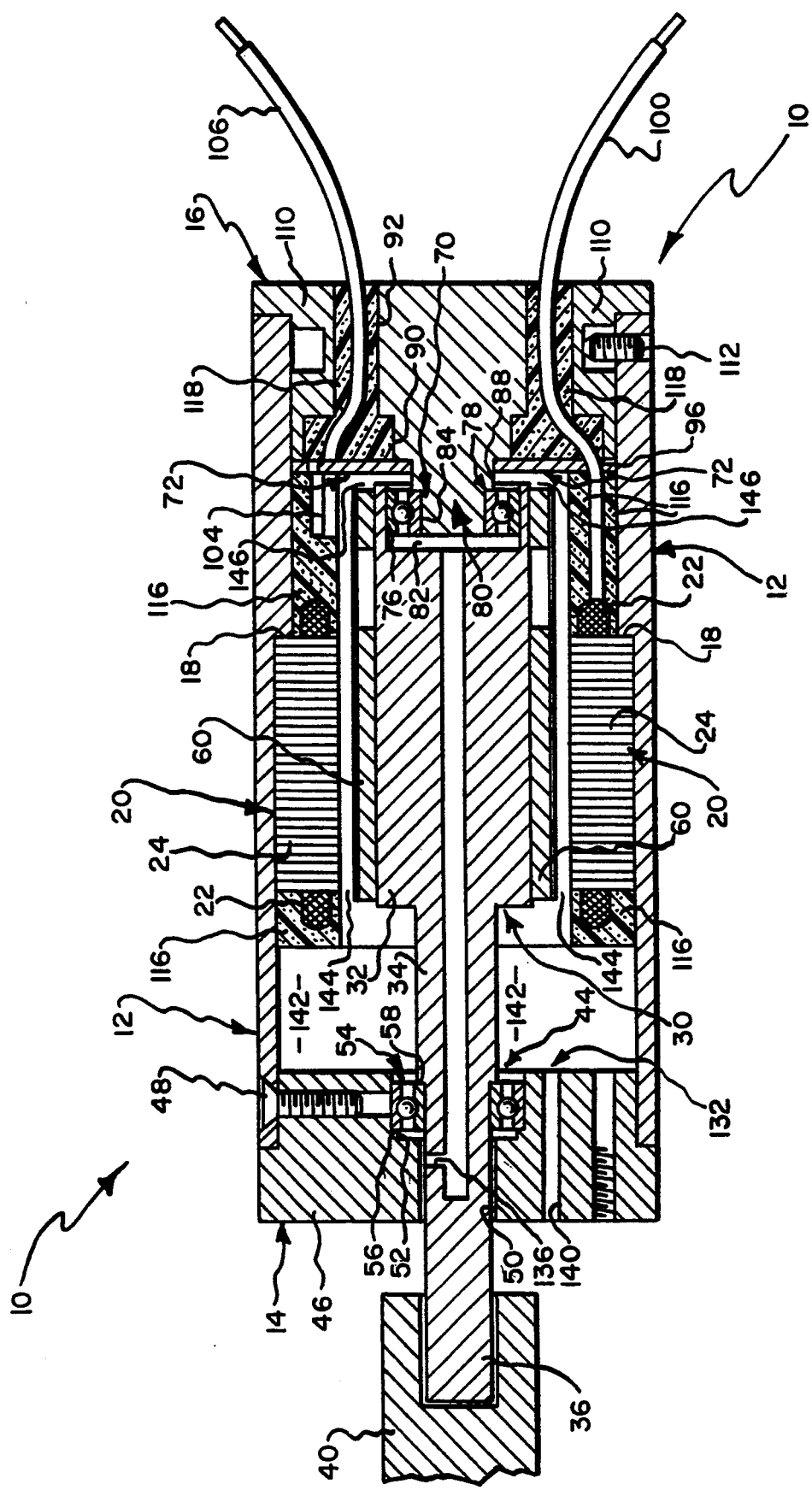

HIGH SPEED BRUSHLESS MOTOR

BACKGROUND OF THE INVENTION

This invention relates to the electric motor art, and more particularly to a new and improved d.c. brushless motor.

One area of use of the present invention is operating surgical and dental instruments, although the principles of the present invention can be variously applied. D.C. brushless motors find advantageous use in operating surgical and dental instruments because they can deliver high speed at the required levels of torque and still be small in size and quiet in operation. Recent surgical developments such as laporascopic surgery impose demanding requirements on high speed motor operation. This, in turn, requires that the motor assembly be structurally rigid and vibration free which is critical at high speed operation. In addition to satisfying these requirements it would be highly advantageous to provide such a motor assembly wherein the electrical and other components thereof can withstand autoclave sterilization.

SUMMARY OF THE INVENTION

It is, therefore, a primary object of the present invention to provide a new and improved brushless d.c. motor assembly.

It is a further object of this invention to provide such a motor assembly which is structurally rigid and relatively vibration free during high speed operation.

It is a further object of this invention to provide such a motor assembly wherein the electrical portion thereof can withstand autoclave sterilization.

It is a more particular object of this invention to provide such a motor assembly wherein the rotor thereof is journalled in a manner allowing complete potting of the internal electrical components of the motor.

It is a further object of the present invention to provide such a motor assembly wherein bearings therein can withstand autoclave sterilization.

The present invention provides a brushless d.c. motor comprising a housing, an annular stator coil structure within the housing, a rotor concentric with the stator and comprising a body having an output shaft portion extending from one end thereof toward the forward end of the housing for connection to a mechanical load for driving the same and permanent magnet means on the periphery of the rotor body operatively associated with the stator coil structure, means near the forward end of the housing for rotatably supporting the shaft portion of the rotor and wherein there is provided bearing means axially inwardly of the rear end of the rotor for rotatably supporting that end of the rotor and circuit board means located between the rear end of the rotor and the rear end of the housing. By virtue of the location of the bearing means a rigid and vibration free structure is provided for operation of the motor at high speed. By virtue of the location of the bearing means and the circuit board means potting material can encapsulate the stator coil structure and circuit board means thereby completely Sealing all electrical sections of the motor so that they can withstand autoclave sterilization conditions. There is also provided fluid passage means for equalizing pressure applied to the rotor bearings so that they can withstand autoclave sterilization conditions.

The foregoing and additional advantages and characterizing features of the present invention will become clearly apparent upon a reading of the ensuing detailed description wherein:

BRIEF DESCRIPTION OF THE DRAWING FIGURES

The single figure of the drawing is a longitudinal sectional view of a d.c. brushless motor according to the present invention.

DETAILED DESCRIPTION OF THE ILLUSTRATED EMBODIMENT

Referring now to the drawing, the motor 10 according to the present invention includes a housing 12 which is generally hollow cylindrical in shape and which has a forward end 14 and a rear end 16 as viewed in the drawing. Housing 12 in the present illustration has a constant outer diameter, and the inner surface of housing 12 includes a pair of portions of slightly different diameter which meet in an annular shoulder 18. An annular stator coil structure 20 is located within housing 12, the outer surface thereof contacting the larger diameter portion of the housing inner surface and one end of stator coil structure 20 abutting shoulder 18. The stator coil structure 20 comprises a coil 22 and laminations 24 in a known manner. The stator coil structure 20 per se forms no part of the present invention and is conventional in structure as is well known to those skilled in the art.

Motor 10 according to the present invention further comprises a rotor generally designated 30 concentric within coil structure stator 20 and comprising a body 32 having an output shaft portion 34 extending from one end thereof, i.e. the forward end of rotor 30 corresponding to the forward end 14 of housing 12, toward the forward end 14 of housing 12 for connection to a mechanical load for driving the same. In the present illustration, on, shaft portion 34 has an end 36 which is connected in a suitable manner to the mechanical load, generally designated 40, which the motor 10 drives. There is also provided means generally designated 44 for supporting the motor shaft portion 34 in housing 12. In the motor shown, supporting means 44 comprises a generally circular end cap 46 received in the end of housing 12 and fixed thereby by screws 48. End cap 46 is provided with a central opening 50 through which shaft portion 34 extends. Opening 50 is provided with a larger diameter section 52 which serves as an annular recess to receive a bearing assembly 54 in which shaft portion 34 is journaled. Bearing assembly 54 is fixed against axial movement by engagement with annular shoulders 56 and 58 formed in end cap 46 and shaft portion 34, respectively.

Rotor 30 further comprises permanent magnet means 60 on the periphery of body 32 and operatively associated with stator coil structure 20. Permanent magnet means 60 extends axially along rotor body 32 and circumferentially therearound and is spaced a relatively short distance in a radial direction from stator coil structure 20. Thus, an annular air gap of relatively small size in a radial direction is defined between permanent magnet means 60 and stator coil structure 20. The material and structure of permanent magnet means 60 and the manner in which it is provided on the periphery of rotor body 32 are well-known to those skilled in the art.

In accordance with the present invention there is provided second bearing means generally designated 70 between the first-named bearing means 54 and the other end of rotor 30, i.e. the rear end of rotor 30, for rotatably supporting the other end of rotor 30. By virtue of the location of bearing means 70, a circuit board means generally designated 72 is located between the other or rear end of rotor 30 and the rear end 16 of housing 12 for a purpose which will be described. In particular, the rear end of rotor 30 is provided with a recess 76 for receiving bearing means generally designated 78 for rotatably supporting rotor body 34, and bearing means 78 in turn is rotatably supported by means in the form of a bearing support journal 80 fixed in housing 12. Recess 76 is generally circular extending axially inwardly in rotor body 34 from the rear end thereof and has a diameter substantially equal to the outer diameter of bearing means 78 for receiving the same. Recess 76 has an axial length greater than that of bearing means 78 thereby defining a region between the inner axial surface of recess 76 and bearing means 78 which recess contains the combination 82 of a Belleville washer and at least one shim.

Bearing support journal 80 is in the form of a cylindrical plug which is smaller in overall diameter than housing 12 so as to be accommodated therein. One axial end face of journal plug 80 abuts the Belleville washer-shim combination 82 and the opposite axial end face is substantially flush with the rear end 16 of motor housing 12. Journal plug 80 has a first diameter portion 84 extending from the inner axial end face and on which bearing assembly 78 is journalled. Thus, bearing assembly 78 is fixed axially by the washer-shim combination 82 on the left-hand side as viewed in the drawing and by an annular shoulder defined by the transition between portion 84 and an axially-adjacent and slightly larger diameter portion 88. Circuit board means 72 is provided with a central opening of a diameter enabling it to receive plug portion 80 in a relatively snug-fitting manner. Circuit board means 72 rests against an annular shoulder defined by the transition between portion 88 and an axially-adjacent, slightly larger diameter portion 90. The step-like progressively increasing diameter portions 84, 88 and 90 extend along about one-half the axial length of journal plug 80. The remainder of the axial length of plug 80 comprises a constant diameter portion 92 of a size slightly larger in diameter as compared to portion 90.

The outer diameter of circuit board means 72 is substantially equal to the inner diameter of housing 12 so as to be snugly received therein. As shown in the drawing, circuit board means 72 is disposed in a plane substantially perpendicular to the longitudinal axis of the cylindrical housing 12. Circuit board means 72 is provided with an opening 96 therein allowing passage therethrough of a conductor 100 for making electrical connection to stator coil 22. There is provided a Hall Effect sensor device 104 on circuit board means 72 for commutation of motor 10 in a known manner. Another conductor 106 is provided for making electrical connection to device 104. Both conductors extend axially outwardly from the rear end of motor 10 through an annular space defined between portion 92 of journal plug 80 and the inner surface of an end cap 110, rotatably adjustably mounted in housing 12 by means of set screw 112.

In accordance with the present invention, there is provided potting material completely encapsulating the electrical components of motor 10. In particular, a first section 116 of potting material encapsulates stator coil structure 20, a portion of conductor 100 leading from winding 22, and Hall Effect sensor device 104. A second section 118 of potting material completely fills the annular space or passage between the outer surface of bearing support 80 and the inner surface of end cap 110, thereby encapsulating the portion of circuit board means 72 containing electrical components. Thus, the potting material 116,118 completely encapsulates the stator coil structure 20 and the circuit board means 72 thereby completely sealing all electrical sections of motor 10.

In accordance with the present invention, there is provided fluid passage means in fluid communication with the first and second bearing means 54 and 78, respectively, for equalizing the pressure applied to the bearing means 54,78 when motor 10 is exposed to steam autoclave sterilization. Such pressure equlization eliminates the washing effect of steam passing through the bearings 54,78 which otherwise could remove the bearing grease or lubricant. Each of the bearings 54 and 78 has opposite axial end faces disposed toward the front and rear ends, respectively, of motor housing 12 as viewed in the drawing and the fluid passage means of the present invention equalizes pressures applied to the axial end faces of the bearings 54,78.

In particular, the fluid passage means comprises a first branch generally designated 130 in fluid communication with the axial end faces of the bearings 54 and 78 facing the forward end of housing 12, i.e. the left-hand end as viewed in the drawing, and a second branch generally designated 232 in fluid communication with the axial end face of bearings 54 and 78 facing toward the rear end of housing 12, i.e. the right-hand end as viewed in the drawing. The first branch 130 is defined by bore or passage 134 provided in rotor 30 extending centrally and axially along rotor 30 from the recess 76 at the rear end of rotor 30, i.e. the right-hand end as viewed in the drawing, to an axial location on rotor 30 between the forward end of housing 12, i.e. the left-hand end as viewed in the drawing, and the bearing 54. The first branch 130 also is defined by a radially extending bore or passage 136 in rotor 30 leading from bore 134 to an opening or aperture on the surface of rotor 30 between the forward end of housing 12 and bearing 54. The opening, in turn, is in fluid communication with the forward axial end face of bearing 54 via the space between rotor shaft portion 34 and end cap 46 and the open portion of the recess containing bearing 54. By virture of the first branch 130 comprising passages 134 and 136, the forward axial end faces of bearings 54 and 78 are in fluid communication and both of those end faces of bearings 54 and 78 are exposed to the pressure of stream during autoclaving as will be explained presently.

The second branch 132 of the fluid passage means is defined by a bore or passage 140 provided in the front end cap or portion 46 of housing 12 and leading from the atmosphere to the housing interior regions designated 142,144 and 146 which are exposed to, i.e. in fluid communication with, the axial end faces of bearings 54 and 78 which face the rear end of housing 12. As seen from the drawing, region 142 is exposed to the rear axial end face of bearing 54, region 146 is exposed to the rear axial end face of bearing 78 and regions 142 and 142 are in fluid communication via region 144, i.e. the gap between stator coil structure 20 and rotor magnets 60. By virtue of the second branch 132 comprising passage 140 and regions 142,144 and 146 the rear axial end faces of bearings 54 and 78 are in fluid communication and both of those end faces of bearings 54 and 78 are exposed to the pressure of steam during autoclaving as will be explained presently.

Motor 10 operates in a manner similar to known brushless d.c. motors, and their operation is readily understood by those skilled in the art. Briefly, such brushless d.c. motors produce their output torque via the interaction between a magnetic field produced by the permanement magnet rotor 30 and a magnetic field due to d.c. current in the stator structure 20. The Hall Effect sensor 104 detects the magnitude and polarity of the magnetic field, and the sensor output is utilized by control circuitry (not shown) to control the current to stator coil 22 all in a conventional manner.

The location of the rear bearing 78 inside the rotor assembly, i.e. within recess 76 in the end of rotor body 32, causes the rotor assembly to be very rigid and vibration free when rotated which is critical at high r.p.m., i.e. around 100,000 r.p.m. The foregoing location of bearing 78 places it forwardly of circuit board means 72 as viewed in the drawing thereby allowing complete sealing of all electrical sections of motor 10 by means of potting material 116,118. This, in turn, enables the motor construction to survive autoclaving. If bearing 78 were located on an extension of rotor then it would be on the other side of circuit board 72 which would complicate sealing the circuit board from stream during autoclaving. If stream contacts any portion of the electrical section of motor 10, this can cause an electrical short circuit with resultant failure.

During autoclaving, steam in the autoclave is able to enter the first branch 130 of the fluid passage means via the space between rotor shaft portion 34 and end cap 46 and the radial passage 136, and the steam is able to enter the second branch of the fluid passage means via passage 140. As a result, the same steam pressure is applied to the front and rear axial end faces of both bearings 54 and 78. This avoids steam pressure passing through the bearings 54,78 which otherwise would end to wash out or force out the grease or like lubricants in bearings 54,78.

It is therefore apparent that the present invention accomplishes its intended objects. A new and improved brushless d.c. motor assembly is provided which is structurally rigid and relatively vibration free during high speed operation and wherein the electrical portion thereof can withstand autoclave sterilization, the rotor of the motor assembly being journalled in a manner allowing complete potting of the internal electrical components of the motor. Steam pressure applied to the rotor bearings is equalized so that they can withstand autoclave sterilization conditions.

While the present invention has been described in detail, that is for the purpose of illustration, not limitation.

What is claimed is:
1. A brushless d.c. motor comprising:
a) a housing;
b) an annular stator coil structure within said housing;
c) a rotor concentric with said stator and comprising a one-piece body having a periphery and having an integral output shaft portion extending from one end thereof for connection to a mechanical load for driving the same and permanent magnet means on the periphery of said body operatively associated with said stator coil structure;
d) means for rotatably supporting said shaft portion in said housing;
e) a recess in the opposite end of said rotor body;
f) bearing means in said recess for rotatably supporting said rotor body; and
g) means for supporting said bearing means in said housing;
h) so that a rigid and vibration free structure is provided for operation of said motor at high speed.

2. Apparatus according to claim 1, wherein said rotor output shaft portion is at a forward end of said motor and wherein said bearing means is located inwardly of a rear end of said motor.

3. A brushless d.c. motor comprising:
a) a housing having a forward end and a rear end;
b) an annular stator coil structure within said housing;
c) a rotor concentric with said stator coil structure and comprising a body having a periphery and having an output shaft portion extending from one end thereof toward the forward end of said housing for connection to a mechanical load for driving the load and permanent magnet means on the periphery of said body operatively associated with said stator coil structure;
d) first bearing means near the forward end of said housing for rotatably supporting said shaft portion of said rotor;
e) second bearing means spaced between said first bearing means and an other end of said rotor for rotatably supporting said other end of said rotor, Said other end of said rotor being located inwardly of said rear end of said housing;
f) circuit board means between said other end of Said rotor and said rear end of said housing; and
g) potting material in said housing encapsulating said stator coil structure and said circuit board means so that said stator oil structure and circuit board means can withstand autoclave sterilization conditions.

4. A brushless d.c. motor comprising:
a) a housing having a forward end and a rear end;
b) an annular stator coil structure within said housing;
c) a rotor concentric with said stator and comprising a body having periphery and having an output shaft portion extending from one end thereof toward the forward end of said housing for connection to a mechanical load for driving the load and permanent magnet means on the periphery of said body operatively associated with said stator coil structure;
d) first bearing means near the forward end of said housing for rotatably supporting said shaft portion of said rotor;
e) second bearing means spaced between said first bearing means and an other end of said rotor for rotatably supporting said other end of said rotor; and
f) fluid passage means in fluid communication with said first and second bearing means for equalizing pressure applied to said first and second bearing means when said motor is exposed to steam autoclave sterilization.

5. Apparatus according to claim 4, wherein each of said first and second bearing means has opposite axial end faces disposed toward said forward and rear ends, respectively, of said housing and wherein said fluid passage means equalizes pressures applied to said axial end faces of said first and second bearing means.

6. A brushless d.c. motor comprising:
a) a housing;
b) an annular stator coil structure within said housing;

c) a rotor concentric with said stator and comprising a body having a periphery and having an output shaft portion extending from one end thereof for connection to a mechanical load for driving the same and permanent magnet means on the periphery of said body operatively associated with said stator coil structure;

d) means for rotatably supporting said shaft portion in said housing;

e) a recess in the opposite end of said rotor body;

f) bearing means in said recess for rotatably supporting said rotor body;

g) means for supporting said bearing means in said housing;

h) so that a rigid and vibration free structure is provided for operation of said motor at high speed;

i) said rotor output shaft portion being at a forward end of said motor and said bearing means being located inwardly of a rear end of said motor; and j) circuit board means located between said bearing means and said rear end of said motor.

7. Apparatus according to claim 6, further including potting material in said housing encapsulating said stator coil structure and said circuit board means so that said stator coil structure and said circuit board means can withstand autoclave sterilization conditions.

8. A brushless d.c. motor comprising:

a) a housing having a forward end and a rear end;

b) an annular stator coil structure within said housing;

c) a rotor concentric with said stator coil structure and comprising a body having a periphery and having an output shaft portion extending from one end thereof toward the forward end of said housing for connection to a mechanical load for driving the load and permanent magnet means on the periphery of said body operatively associated with said stator coil structure;

d) first bearing means near the forward end of said housing for rotatably supporting said shaft portion of said rotor;

e) second bearing means spaced between said first bearing means and an other end of said rotor for rotatably supporting said other end of said rotor;

f) circuit board means between said other end of said rotor and said rear end of said housing; potting material in said housing encapsulating said stator coil structure and said circuit board means so that said coil structure and circuit board means can withstand autoclave sterilization conditions; and h) a recess in said rotor body at said other end of said rotor for receiving said second bearing means and means for supporting said second bearing means in said housing so that a rigid and vibration free structure is provided for operation of said motor at high speed.

9. A brushless d.c. motor comprising:

a) a housing having an interior and a forward end and a rear end;

b) an annular stator coil structure within said housing;

c) a rotor concentric with said stator and comprising a body having a periphery and having an output shaft portion having a surface and extending from one end thereof toward the forward end of said housing for connection to a mechanical load for driving the load and permanent magnet means on the periphery of said body operatively associated with said stator coil structure;

d) first bearing means near the forward end of said housing for rotatably supporting said shaft portion of said rotor;

e) second bearing means spaced between said first bearing means and an other end of said rotor for rotatably supporting said other end of said rotor;

f) fluid passage means in fluid communication with said first and second bearing means for equalizing pressure applied to said first and second bearing means when said motor is exposed to steam autoclave sterilization;

g) each of said first and second bearing means having opposite axial end faces disposed toward said forward and rear ends, respectively, of said housing and said fluid passage means equalizing pressures applied to said axial end faces of said first and second bearing means; and h) said fluid passage means comprising a first branch in fluid communication with the axial end faces of said first and second bearing means facing said forward end of said housing and a second branch in fluid communication with the axial end faces of said first and second bearing means facing toward said rear end of said housing.

10. Apparatus according to claim 9, wherein said first branch is located in said rotor and said second branch is located in said housing.

11. Apparatus according to claim 9, wherein said first branch extends from the other end of said rotor body adjacent said second bearing means to a location on the surface of said rotor output shaft portion between the forward end of said housing and said first bearing means.

12. Apparatus according to claim 9, wherein said second branch extends from the atmosphere to the interior of said housing exposed to the axial end faces of said first and second bearing means facing the rear end of said housing.

* * * * *

UNITED STATES PATENT AND TRADEMARK OFFICE
CERTIFICATE OF CORRECTION

PATENT NO. : 5,394,043
DATED : February 28, 1995
INVENTOR(S) : Song-Ling Hsia

It is certified that error appears in the above-indentified patent and that said Letters Patent is hereby corrected as shown below:

Column 2, line 30 should be --"stator coil structure" instead of "coil structure stator"--.

Column 6, line 34, claim 3 should be-- "coil"

Signed and Sealed this

Thirtieth Day of May, 1995

Attest:

BRUCE LEHMAN

*Attesting Officer*  *Commissioner of Patents and Trademarks*